United States Patent [19]

Geke et al.

[11] Patent Number: 4,973,423

[45] Date of Patent: Nov. 27, 1990

[54] FOAM-INHIBITING ADDITIVES IN LOW-FOAM CLEANING COMPOSITIONS: POLYETHYLENE GLYCOL ETHERS

[75] Inventors: Juergen Geke, Duesseldorf; Erich Boebers, Krefeld; Gilbert Schenker, Erkrath; Robert Piorr, Ratingen-Hoesel; Karl-Heinz Schmid, Mettmann, all of Fed. Rep. of Germany

[73] Assignee: Ecolab Inc., St. Paul, Minn.

[21] Appl. No.: 233,649

[22] Filed: Aug. 17, 1988

[30] Foreign Application Priority Data

Aug. 17, 1987 [DE] Fed. Rep. of Germany ....... 3727378

[51] Int. Cl.$^5$ ......................... C11D 1/72; B01D 19/04

[52] U.S. Cl. ............................... 252/174.21; 252/173; 252/174.22; 252/321; 252/358

[58] Field of Search ............... 252/173, 174.21, 174.22

[56] References Cited

U.S. PATENT DOCUMENTS

| | | | |
|---|---|---|---|
| 3,684,723 | 8/1972 | Best et al. | 252/132 |
| 4,548,729 | 10/1985 | Schmid et al. | 252/174.21 |
| 4,780,237 | 10/1988 | Schmid et al. | 252/174.22 |
| 4,797,222 | 1/1989 | Hoefer et al. | 252/174.21 |

FOREIGN PATENT DOCUMENTS

| | | |
|---|---|---|
| 2556544 | 6/1977 | Fed. Rep. of Germany . |
| 3800490 | 7/1989 | Fed. Rep. of Germany . |

OTHER PUBLICATIONS

Chemical Abstract: 87: 70173d.

*Primary Examiner*—A. Lionel Clingman
*Attorney, Agent, or Firm*—Ernest G. Szoke; Wayne C. Jaeschke; John E. Drach

[57] ABSTRACT

Short-chain polyethlene glycol ethers corresponding to the formula:

$$R^1—O—(CH_2CH_2O)_n—R^2$$

wherein:

$R^1$ is a linear or branched $C_6$–$C_{18}$ alkyl or alkenyl radical, $R^2$ is a $C_4$–$C_8$ alkyl radical, and N is an integer of from 2 to 6, are used as foam-inhibiting additives for low-foam cleaning compositions.

7 Claims, No Drawings

FOAM-INHIBITING ADDITIVES IN LOW-FOAM CLEANING COMPOSITIONS: POLYETHYLENE GLYCOL ETHERS

BACKGROUND OF THE INVENTION

1. Field of the Invention

This invention relates to the use of short-chain, terminally blocked alkyl polyethylene glycol ethers as foam inhibiting additives in low-foam cleaning compositions.

2. Statement of Related Art

Aqueous cleaning compositions intended for institutional and industrial use, particularly for the cleaning of metal, glass, ceramic and plastic surfaces, generally contain substances which are capable of counteracting unwanted foaming. In most cases, foam inhibiting additives are used because the soil particles become detached from the surfaces being cleaned and enter the cleaning baths where they act as foam generators. In addition, the use of anti-foam agents may also be necessitated by the fact that the cleaning compositions themselves contain constituents which give rise to unwanted foaming under the prevailing working conditions, for example anionic surfactants or nonionic surfactants which foam at the working temperature.

U.S. Pat. No. 4,548,729 describes the use of polyethylene glycol ethers corresponding to the following formula as foam inhibiting additives in cleaning compositions:

$$R^1\text{-O-}(CH_2CH_2O)_n\text{-}R^2$$

wherein:

$R^1$ is a linear or branched $C_8$–$C_{18}$ alkyl or alkenyl radical, $R^2$ is a $C_4$–$C_8$ alkyl radical, and n is a number of 7 to 12.

One of the limitations associated with the use of these foam inhibitors is that they do not provide acceptable foam inhibition properties at lower temperatures, i.e., below 20° to 25° C., where it is desirable to maintain such properties.

DESCRIPTION OF THE INVENTION

Other than in the operating examples, or where otherwise indicated, all numbers expressing quantities of ingredients or reaction conditions used herein are to be understood as modified in all instances by the term "about".

The present invention provides foam inhibitors which are superior in performance to state-of-the-art foam inhibitors, particularly at temperatures below 20° to 25° C., and which at the same time exhibit biodegradability. This is based on the discovery that compositions containing certain short-chain terminally blocked adducts of ethylene oxide with relatively long-chain aliphatic alcohols, as hereinafter defined, satisfy the stated requirements both with regard to foam inhibition at low temperatures and with regard to biodegradability.

It has surprisingly been found that cleaning compositions containing relatively short-chain polyethylene glycol ethers have an excellent antifoam effect, even at temperatures below 20° to 25° C., in contrast to compositions containing the relatively long-chain polyethylene glycol ethers of U.S. Pat. No. 4,548,729.

Polyethylene glycol ethers used in the present invention correspond to the following formula I:

$$R^1\text{-O-}(CH_2CH_2O)_n\text{-}R^2 \quad (I)$$

wherein:

$R^1$ is a linear or branched $C_6$–$C_{18}$ alkyl or alkenyl radical, $R^2$ is a $C_4$–$C_8$ alkyl radical, and n is an integer of from 2 to 6.

Mixtures of different ethers within the scope of formula I may also be used.

A particularly preferred embodiment of the present invention includes the use of polyethylene glycol ethers of formula I wherein n is 3 or 4. It is also particularly preferred to use compounds of formula I wherein $R^2$ is n-butyl and $R^1$ is octyl or decyl.

Suitable starting materials for the preparation of the polyethylene glycol ethers of formula I include the fatty alcohols such as n-octanol, n-nonanol, n-decanol, n-undecanol, n-dodecanol, n-tridecanol, n-tetradecanol, n-pentadecanol, n-hexadecanol, n-heptadecanol, n-octadecanol, n-9-octadecen-1-ol (oleyl alcohol), including isomers thereof branched at the alkyl group and isomers thereof containing OH groups at internal carbon atoms, and also including oxoalcohols having the indicated number of carbon atoms. These alcohols may be used either individually or in admixture. It is most preferred to use straight-chain alkanols containing an even number of carbon atoms, as well as mixtures thereof.

The alkyl polyethylene glycol ethers of the present invention may be prepared by reacting one or more of the fatty alcohols described above with ethylene oxide in a molar ratio of 1:2 to 1:6, followed by etherification of the hydroxyl groups present in the reaction product. The reaction with ethylene oxide occurs under conventional alkoxylation conditions, preferably in the presence of suitable alkaline catalysts. The etherification of the free hydroxyl group may be preferably carried out under the conventional conditions of the Williamson ether synthesis using straight-chain or branched $C_4$–$C_8$ alkyl halides, including n-butyl iodide, sec.-butyl bromide, tert.-butyl chloride, amyl chloride, tert.-amyl bromide, n-hexyl chloride, n-heptyl bromide and n-octyl chloride. It is preferred to use the alkyl halide and alkali compound in a stoichiometric excess, for example an excess of 100 to 200%, over the hydroxyl groups to be etherified.

The biological degradability of the terminally blocked alkyl polyethylene glycol ethers of general formula (I) used in accordance with the present invention is equivalent to a BiAS removal of more than 80% (German detergent legislation), as determined by the prescribed methods.

The terminally blocked polyethylene glycol ethers of formula I used in accordance with the present invention may be distinguished by their alkali and acid stability. The foam inhibiting effect of the compounds of formula I at temperatures below 20° to 25° C. in alkaline to mildly acidic cleaning solutions is superior to that of prior art foam inhibitors.

The cleaning compositions in accordance with the present invention may also contain other ingredients typically present in such compositions, including wetting agents, builders and complexing agents, alkalis or acids, corrosion inhibitors, antimicrobial agents and organic solvents.

Suitable wetting agents may be nonionic surfactants, including polyglycol ethers of the type obtained by addition of ethylene oxide onto alcohols, particularly fatty alcohols, alkyl phenols, fatty amines and carboxylic acid amides. Anionic wetting agents which may be used include alkali metal, amine and alkanolamine salts of fatty acids, alkyl sulfuric acid, alkyl sulfonic acid and alkyl benzenesulfonic acids. The preferred builders and complexing agents which may be present in the cleaning compositions of this invention include alkali metal orthophosphates, polyphosphates, silicates, borates, carbonates, polyacrylates and gluconates as well as citric acid, nitriloacetic acid, ethylenediaminetetraacetic acid, 1-hydroxyalkane-1,1-diphosphonic acids, aminotri(methylenephosphonic acid) and ethylenediaminetetra(methylenephosphonic acid), phosphonoalkane polycarboxylic acids such as phosphonobutanetri carboxylic acid, and alkali metal salts or amine salts of these acids. Highly alkaline cleaning preparations, particularly bottlewashing detergents, may contain considerable quantities of caustic alkali in the form of sodium and potassium hydroxide. If it is desired to obtain special cleaning effects, the cleaning compositions may contain organic solvents including alcohols, gasoline fractions and chlorinated hydrocarbons, and free alkanolamines.

In the context of the invention, cleaning compositions are understood to include aqueous solutions intended for direct application to the substrates to be cleaned. In addition, the term "cleaning compositions" also applies to concentrates and solid mixtures intended for the preparation of the working solutions, such as by dissolution in water.

The terminally blocked polyethylene glycol ethers used in accordance with the present invention are added to the cleaning compositions in such quantities that their concentration in the ready-to-use or working solutions is preferably between 10 and 2500 ppm and more preferably between 50 and 500 ppm.

This invention also provides for foam inhibiting concentrates adapted for use in aqueous solution. Such concentrates normally contain 1 to 30% by weight of the polyethylene glycol ethers of this invention. Wetting agents, when present in the cleaning concentrates of this invention, may be used generally at a level of 1 to 25% by weight; builder salts, when present, may be used generally at a level of 1 to 80% by weight; and caustic alkali or acid, when present, may be used generally at a level of 1 to 80% by weight.

The invention is illustrated by the following Examples.

Polyethylene glycol ethers of formula (I), in which $R^1$ is a $C_8$–$C_{10}$ n-alkyl radical, $R^2$ is a $C_4$ alkyl radical and n is 3 or 4, were tested in the formulations of this invention as set forth in Examples 1 to 5. Polyethylene glycol ethers according to U.S. Pat. No. 4,548,729 in which $R^1$ represents $C_8$–$C_{18}$ n-alkyl radicals, $R^2$ is a $C_4$ alkyl radical and n is 10, were tested in the formulations of Comparison Examples 6–9.

The particular polyethylene glycol ether used in each example is set forth in Table 1. The Table also sets forth the temperatures at which each designated composition was found to be sprayable.

The antifoam effect was tested in a simulated 10-liter continuous spray plant at a spraying pressure of 3 to 10 bar (30 mm smooth jet nozzle). The circulation volume was approximately 10 to 19 liters/min.

In the following Examples, the cleaning solutions which, in continuous operation, had only a thin covering of foam (<1 cm thick) for otherwise rapid foam collapse were designated as sprayable with minimal foaming at the particular in-use temperatures indicated.

TABLE 1

| | Composition (I) | | | | |
|---|---|---|---|---|---|
| Surfactant | $R^1$ | $R^2$ | n | Example | Sprayability |
| A | $C_{8-10}H_{17-21}$ | $C_4H_9$ | 4 | 1,3,5 | ≧15° C. |
| B | $C_{8-10}H_{17-21}$ | $C_4H_9$ | 3 | 2,4 | ≧15° C. |
| C | $C_{12-18}H_{25-37}$ | $C_4H_9$ | 10 | 6,8,9 | >35–40° C. |
| D | $C_8H_{17}$ | $C_4H_9$ | 10 | 7 | >30° C. |

EXAMPLE 1

400 ppm surfactant A

Iron and steel plates were treated with an aqueous solution of this surfactant at 15° C. The cleaning effect was good and no troublesome foaming was observed.

EXAMPLE 2

400 ppm surfactant B

A short-chain PE glycol ether analogous to that used in Example 1 was employed and foam-free sprayability was achieved at temperatures of ≧15° C.

EXAMPLE 3

2500 ppm diethanolamine salt of isononanoic acid;
2000 ppm diethanolamine;
100 ppm benztriazole;
400 ppm surfactant A.

Iron and steel plates were treated with an aqueous solution of this cleaning composition (pH 9.0). The cleaning effect was good and no troublesome foaming was observed at 15° C.

EXAMPLE 4

3000 ppm sodium caprylate;
1000 ppm sodium tetraborate×10 $H_2O$ (borax);
1400 ppm sodium tripolyphosphate:
1000 ppm triethanolamine:
200 ppm monoethanolamine:
600 ppm surfactant B.

Iron and steel plates were treated at 15° C. with an aqueous solution of this cleaning composition (pH 9.0). The cleaning effect obtained was good and no troublesome foaming was observed.

EXAMPLE 5

2500 ppm sodium dihydrogen phosphate;
2100 ppm disodium hydrogen phosphate;
1000 ppm tartaric acid;
500 ppm phosphoric acid, 75%;
400 ppm surfactant A.

Iron plates were treated with an aqueous solution of this acidic cleaning composition (pH 3.5) at 15° C. The cleaning effect obtained was good and no troublesome foaming was observed.

COMPARISON EXAMPLE 6

400 ppm surfactant C

A long-chain polyethylene glycol ether in aqueous solution according to U.S. Pat. No. 4,548,729 was tested for comparison with Examples 1 and 2. This surfactant solution was sprayable only at temperatures above 35° C.

COMPARISON EXAMPLE 7

2500 ppm diethanolamine salt of isononanoic acid;
2000 ppm diethanolamine;

100 ppm benztriazole;
400 ppm surfactant D.

A polyethylene glycol ether in aqueous solution according to U.S. Pat. No. 4,548,729 was tested for comparison with Example 3. The solution was not sprayable at a temperature of 15° C. and became sprayable only at temperatures above 30° C.

COMPARISON EXAMPLE 8

3000 ppm sodium caprylate;
1000 ppm sodium tetraborate × 10 $H_2O$ (borax);
1400 ppm sodium tripolyphosphate;
1000 ppm triethanolamine;
200 ppm monoethanolamine;
600 ppm surfactant C.

A relatively long-chain polyethylene glycol ether in aqueous solution according to U.S. Pat. No. 4,548,729 was tested for comparison with Example 4. This system was sprayable only at temperatures above 40° C.

COMPARISON EXAMPLE 9

2500 ppm sodium dihydrogen phosphate;
2100 ppm disodium hydrogen phosphate;
1000 ppm tartaric acid;
500 ppm phosphoric acid, 75%;
400 ppm surfactant C.

A relatively long-chain polyethylene glycol ether in aqueous solution according to U.S. Pat. No. 4,548,729 was tested for comparison with Example 5. The plant foamed over at a temperature of 15 ° C. This system was sprayable only at temperatures above 30° C.

It is to be understood that the above described embodiments of the invention are illustrative only and that modifications throughout may occur to those skilled in the art.

We claim:

1. A foam inhibiting composition comprising an aqueous solution of one or a mixture of polyethylene glycol ethers having the formula:

$$R^1\text{-O-}(CH_2CH_2O)_n\text{-}R^2$$

wherein: $R^1$ is a linear or branched $C_8$ to $C_{10}$ alkyl radical, $R^2$ is an n-butyl radical, and n is an integer equal to 3 or 4, wherein said polyethylene glycol ether is present in said solution at a level of from about 10 to about 2500 parts per million.

2. The composition of claim 1 wherein n is 3.

3. The composition of claim 1 wherein n is 4.

4. The composition of claim 1 wherein $R^1$ is octyl.

5. The composition of claim 1 wherein $R^1$ is decyl.

6. The composition of claim 1 wherein said polyethylene glycol ether is present in said solution at a level of from about 50 to about 500 parts per million.

7. A process for cleaning a surface and avoiding the formation of undesirable foam comprising washing the surface of an object with the composition of claim 1.

* * * * *